United States Patent [19]

Kiuchi

[11] Patent Number: 4,827,405
[45] Date of Patent: May 2, 1989

[54] DATA PROCESSING APPARATUS
[75] Inventor: Toyoo Kiuchi, Tokyo, Japan
[73] Assignee: NEC Corporation, Tokyo, Japan
[21] Appl. No.: 936,063
[22] Filed: Nov. 28, 1986
[30] Foreign Application Priority Data
  Nov. 27, 1985 [JP] Japan .................... 60-267707
[51] Int. Cl.[4] .............................................. G06F 9/22
[52] U.S. Cl. ............................................... 364/200
[58] Field of Search ... 364/200 MS File, 900 MS File
[56] References Cited

U.S. PATENT DOCUMENTS

| | | | |
|---|---|---|---|
| 3,938,098 | 2/1976 | Garlic | 364/200 |
| 3,956,735 | 5/1976 | Cassonnet | 364/200 |
| 4,301,514 | 11/1981 | Eifuku et al. | 364/900 |
| 4,408,276 | 10/1983 | Nishibe | 364/200 |
| 4,430,711 | 2/1984 | Anderson et al. | 364/200 |
| 4,488,224 | 12/1984 | Ippolito et al. | 364/200 |
| 4,652,997 | 3/1987 | Kloker | 364/200 |

Primary Examiner—David L. Clark
Attorney, Agent, or Firm—Foley & Lardner, Schwartz, Jeffery, Schwaab, Mack, Blumenthal & Evans

[57] ABSTRACT

A data processing apparatus comprises a program counter for designating the address of a microinstruction to be read. A decoder receives the microinstruction stored in the address designated by the program counter and generates at least a first selection signal, a second selection signal, a first register address signal and a number-of-counter-selection signal. A first counter receives a first timing signal to count the first timing signal when the first selection signal is active so that the first counter generates a second register address signal incremented at each occurrence of the first timing signal. A multiplexer receives the first and second register address signals to select and output the second register address when the first selection signal is active. A register group including a plurality of registers is responsive to the first timing signal to latch the output of the multiplexer so as to select a register designated by the output of the multiplexer. A second counter receives the first timing signal to count the first timing signal when the second selection signal is active. A comparator is provided to compare the count content of the second counter with the number-of-counter-selection signal and to reset the second counter when the content of the second counter becomes consistent with the number-of-counter-selection signal, with the result that the comparator itself generates one step-up signal to the program counter.

14 Claims, 2 Drawing Sheets

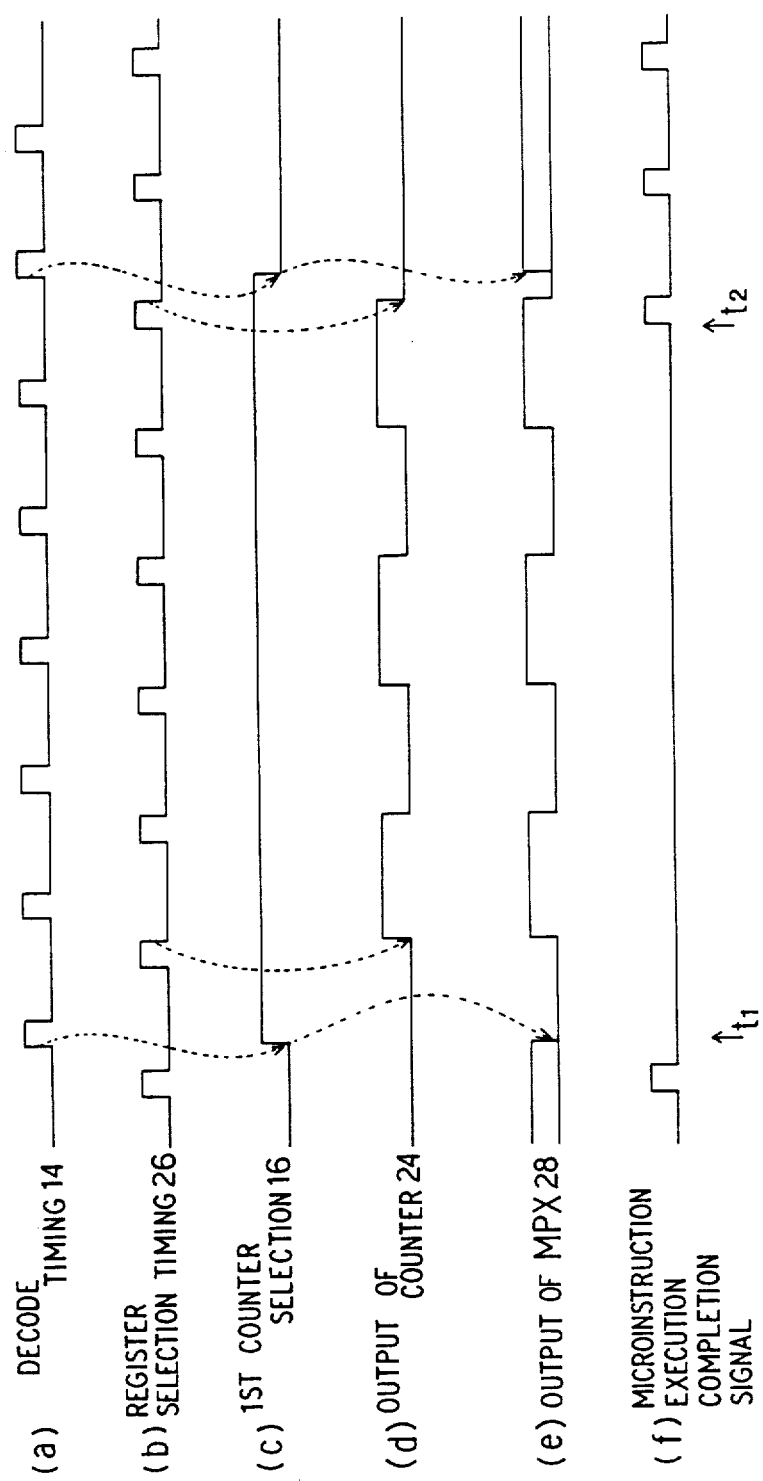

DATA PROCESSING APPARATUS

BACKGROUND OF THE INVENTION

1. Field of the Invention

The present invention relates to a data processing apparatus, and more particularly to a data processing apparatus of the microprogram controlled system operative in response to a microinstruction so as to sequentially and repeatedly select a plurality of registers. More specifically, the present invention relates to a data processor effectively used in a disc memory controller.

2. Description of Related Art

In the conventional data processing apparatus of the above mentioned type, once one microinstruction is executed, individual registers contained in a register group are sequentially selected one by one, but only one round. For example, assuming that two registers A and B are provided, the two registers A and B are sequentially selected as follows with the execution of one microinstruction.

REGISTER A
REGISTER B

In the conventional data processing apparatus, however, a sequential cyclic one-by-one selection of all individual registers cannot be repeated several times with the execution of one microinstruction. For example, in the case of two registers A and B being provided, the following selection cannot be executed with the execution of only one microinstruction.

REGISTER A
REGISTER B
REGISTER A
REGISTER B
REGISTER A
REGISTER B

Therefore, in the case that a test pattern "4489 H" is processed continuously three times, as in processing of address marks in a flexible disc memory, it is indispensable to prepare three microinstructions, each of which causes to execute the processing of "4489 H", so that the pattern "4489 H" is sequentially and continuously executed three times.

As seen from the above, when the operation in which a plurality of individual registers are sequentially selected one by one and one cycle should be repeated several times in the conventional data processing apparatus, it is necessary to prepare microinstructions of the number corresponding to the number of repetitions of the above mentioned operation. As a result, the amount of microinstructions in the data processing apparatus is inevitably increased. In other words, the degree of freedom in the system design is limited in this regard.

SUMMARY OF THE INVENTION

Accordingly, it is an object of the present invention to provide a data processing apparatus in which the above mentioned drawback of the conventional apparatus has been dissolved.

Another object of the present invention is to provide a data processing apparatus which can operate, with the execution of one microinstruction, so as to repeatedly carry out several times such an operation that a plurality of individual registers are sequentially selected one by one.

Still another object of the present invention is to provide such a data processing apparatus which can be used in a controller for a disc memory.

The above and other objects of the present invention are achieved in accordance with the present invention by a data processing apparatus comprising decoder means receiving a microinstruction to generate at least a first selection signal and a number-of-selection signal; first counter means receiving a timing signal and controlled by the first selection signal to generate a first register address signal updated at the timing signal; register means including a plurality of registers and receiving the first register address signal to select one of the registers designated by the register address signal; second counter means adapted to count up in response to the timing signal; and means comparing the content of the second counter means with the number-of-selection signal so as to increment a program counter when the content of the second counter means becomes consistent with the number-of-selection signal.

With this arrangement, when the first counter means is put in an operable condition, since the content of the first counter is updated at the first timing signal, the registers are sequentially and cyclicly selected one by one in accordance with the content of the first counter. This condition is maintained unless the microinstruction is updated. In other words, a plurality of registers can be sequentially and cyclicly selected one by one and at plural rounds with the execution of one microinstruction. Accordingly, in the case of continuously and repeatedly executing the same processing for the registers, the required amount of microinstructions can be decreased.

In one embodiment, the decoder means is adapted to further generate a second register address signal, and further including selection means receiving the first and second register address signals so as to output to the register means one of the first and second register address signals in accordance with the first selection signal.

Further, the decoder means is adapted to further generate a second selection signal to the second counter means, and wherein the second counter means is adapted to be put in a countable condition while the second selection signal is active, and also to be reset by the comparator means when the content of the second counter means becomes constituent with the number-of-selection signal.

Specifically, the first counter means is a 1-bit binary counter and the second counter means is a 3-bit binary counter. In general, the first counter means is a M-bit binary counter (where M is positive integer) and the second counter means is a N-bit binary counter (where N is positive integer not less than M). Furthermore, the selection means is a two-input multiplexor.

According to another aspect of the present invention, there is provided a data processing apparatus comprising a program counter for designating the address of an microinstruction to be read; a decoder receiving the microinstruction stored in the address designated by the program counter and adapted to generate at least a first selection signal, a second selection signal, a first register address signal and a number-of-counter-selection signal; a first counter receiving a first timing signal and controlled by the first selection signal to count the first timing signal when the first selection signal is active so that the first counter generates a second register address signal incremented at each occurrence of the first timing signal; a multiplexor receiving the first and second register address signals and controlled by the first selection signal to select and output the second register address when the first selection signal is active; a register group including a plurality of registers and responsive to the first timing signal to latch the output of the multiplexor and to select a register designated by the output of the multiplexor; a second counter receiving the first timing signal and controlled by the second selection signal to count the first timing signal when the second selection signal is active; and a comparator adapted to compare the count content of the second counter with the number-of-counter-selection signal and to reset the second counter when the content of the second counter becomes consistent with the number-of-counter-selection signal, with the result that the comparator itself generates one step-up signal to the program counter.

According to a third aspect of the present invention, there is provided a data processing apparatus comprising decoder means receiving a microinstruction to generate at least a first selection signal and a number-of-selection signal; first counter means receiving a timing signal and controlled by the first selection signal to generate a first register address signal updated at the timing signal; register means including a plurality of registers and receiving the first register address signal to select one of the registers designated by the register address signal; and means generating a microinstruction execution completion signal when the number of selections of the registers reaches the number indicated by the number-of-selection signal.

Preferably, the microinstruction execution completion signal generating means includes second counter means adapted to count the timing signal so as to generate the microinstruction execution completion signal when the number of selections of the registers reaches the number indicated by the number-of-selection signal.

More specifically, the second counter means includes a second counter adapted to count up in response to the timing signal, and means comparing the content of the second counter means with the number-of-selection signal so as to increment a program counter when the content of the second counter means becomes consistent with the number-of-selection signal.

The above and other objects, features and advantages of the present invention will be apparent from the following description of a preferred embodiment of the invention with reference to the accompanying drawings.

BRIEF DESCRIPTION OF THE DRAWINGS

FIG. 2 is a waveform diagram illustrating the condition of signals at various points in the apparatus shown in FIG. 1.

DETAILED DESCRIPTION OF THE PREFERRED EMBODIMENT

Figure 1:
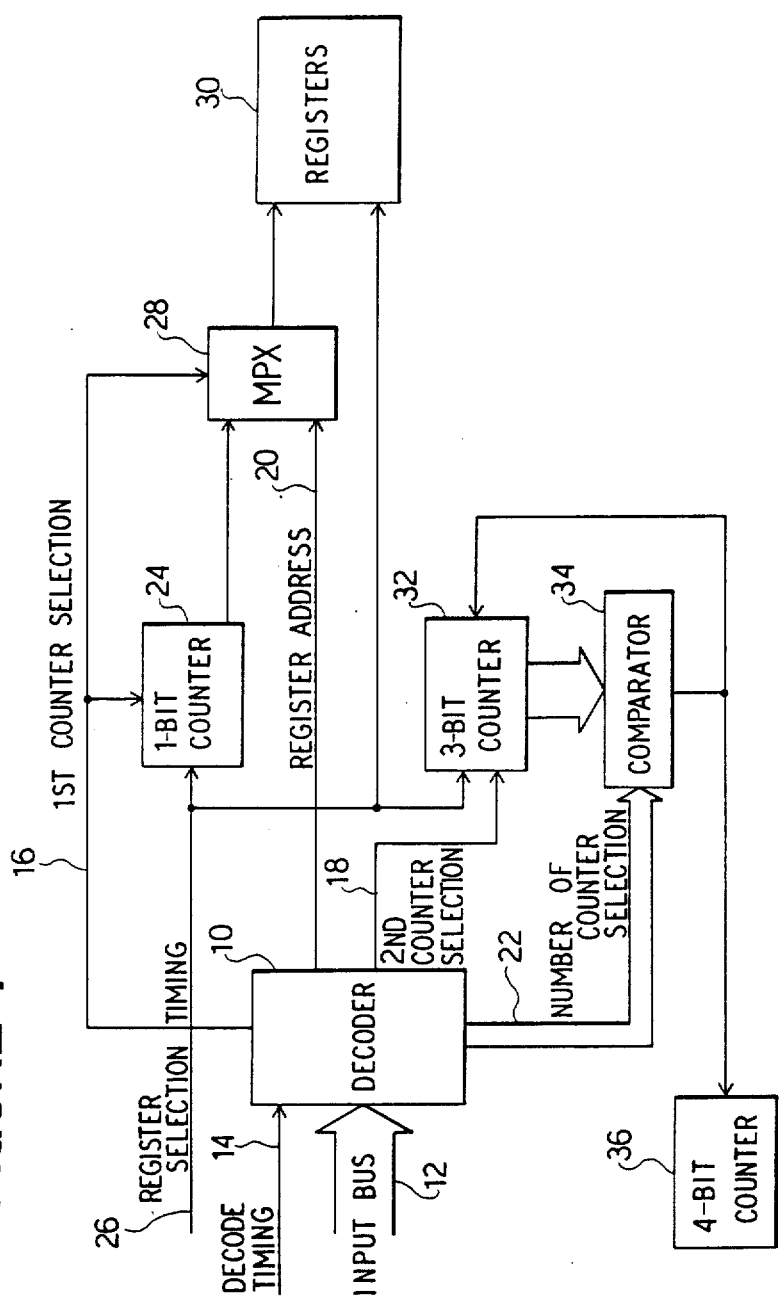
FIG. 1 is a block diagram of one embodiment of the data processing apparatus in accordance with the present invention.

Referring to FIG. 1, there is shown one embodiment of the data processing apparatus in accordance with the present invention, which includes a decoder 10 coupled to a 16-bit input bus 12 to receive a microinstruction read out from a microprogram memory (not shown). This decoder 10 functions to decode the received microinstruction in response to a decode timing signal 14 and to generate at least a first counter selection signal 16, a second counter selection signal 18, a register address signal 20 and a number-of-counter-selection signal 22.

The first counter selection signal 16 is fed to a 1-bit binary counter 24 so as to put it in such an operable condition, so that the counter 24 cyclically counts a register selection timing signal 26 for defining the timing of register selection. The first counter selection signal is also fed to a control input of a multiplexor 28, which in turn receives at its one signal input the output of the counter 24 as another register address signal and at its other signal input the register address signal 20. Thus, the multiplexor 28 selects one of the outputs of the counter 24 and the register address signal 20 in accordance with the first counter selection signal and outputs the selected signal to a group of registers 30. In this embodiment, this register group 30 includes two 8-bit registers A and B, and is adapted so that one of two registers A and B is selected in accordance with the output of the multiplexor in synchronism with the register selection timing signal 26.

Furthermore, the register selection timing signal 26 and the second counter selection signal 18 are applied to a 3-bit binary counter 32. This counter 32 is adapted to count the register selection timing signal 26 under control of the second counter selection signal 18. The output of the counter 32 is connected to one input of a comparator 23, whose other output is connected to receive the number-of-counter-selection signal 22 from the decoder 10. This comparator 34 outputs the result of comparison to a 4-bit counter 36 which constitutes a microinstruction program counter for designating an address in the above mentioned microprogram memory at which address a microinstruction to be executed next is stored. In addition, the output of the comparator 34 is connected to a reset input of the counter 32.

Next, description will be made on an operation of the above mentioned apparatus with reference to the waveform diagram shown in FIG. 2.

When the decoder 10 receives through the input bus 12, from the microprogram memory the microinstruction which includes at least a register field for designating a register included in the register group 30 and a count field for specifying the number of register selection, the decoder 10 decodes the received microinstruction in response to the decode timing signal 14 as shown in FIG. 2 (a), so as to generate the first counter selection signal 16, the second counter selection signal 18, the register address signal 20 and the number-of-counter-selection signal 22. Then, with a first register selection timing signal 26 appearing just after the decode timing signal 14 which has caused the decoder 10 to execute its decode operation, a register selection operation is initiated.

If the generated first counter selection signal 16 is at a low level, i.e., in an inactive condition, the 1-bit binary counter 8 is put in a reset condition so as to generate an output signal of a low level. On the other hand, if the first counter selection signal 16 is at a low level, the multiplexor 28 operates to select and output the register address signal 20 to the register group 30. Thus, the register group 30 operates to latch the register address signal 20 in response to the rising edge of the register selection timing signal 26, and select one of the registers designated by the latched register address signal 20. In other words, in the case that the first counter selection signal 14 is inactive, the register group 30 is addressed directly in accordance with the code included in the microinstruction.

However, at a timing $t_1$, if the first counter selection signal 16 is brought to a high level, i.e., into an active condition, the 1-bit counter 24 becomes operable and therefore operates to reverse its output signal condition at the falling edge of each register selection timing signal 26 as shown in FIG. 2 (d). On the other hand, when the first counter selection signal 16 is active, the multiplexor 28 selects the output of the 1-bit counter 24 as shown in FIG. 2 (e). Thus, the register group 30 latches the output of the 1-bit counter 24 at the rising edge of each register selection timing signal 26, so that one register contained in the register group 30 is addressed in accordance with the latched output of the 1-bit counter 24. As mentioned above, in this embodiment, the register group 30 includes the two 8-bit registers A and B. Therefore, the registers A and B are alternatively selected at each inversion of the output of the 1-bit counter (i.e., the multiplexor 28) in such a manner that when the output of the multiplexor 28 is at a low level, the register A is selected, and when the output of the multiplexor 28 is at a high level, the register B is selected.

On the other hand, the second counter selection signal is ceaselessly maintained at a high level while the apparatus is in the register selection cycle. With this high level second counter selection signal, the 3-bit counter 32 operates to count up at the rising edge of each register selection timing signal 26. The count value of the counter 30 is supplied to the one input of the comparator 34. Incidentally, the counter 32 is a reset condition at the time $t_1$, because the output of the comparator 34 has been brought into a high level just before the time $t_1$, so as to reset the counter 32. Therefore, the content "0" of the counter 32 is outputted to the comparator 34 at the time $t_1$. Thereafter, the counter 32 is incremented at the rising edge of each register selection timing signal 26, so that the content of the counter is incrementally counted up to "1", then "2", further "3" .... The comparator 34 compares the number-of-counter-selection signal 22 with the count output of the counter 34, and maintains its output signal at a low level until the signal 22 becomes consistent with the output of the counter 32.

Assuming that the number-of-counter-selection signal 22 indicates "6", since the content of the counter 32 is brought to "6" at a timing $t_2$ consistent with the rising edge of the sixth register selection timing signal 26 counted from the register selection timing signal appearing just after the counter 32 is put in a countable condition. As a result, the comparator 34 outputs a high level signal to the counter 32, so that the counter 32 is reset. Therefore, the output of the counter is returned to "0", and so, the output of the comparator is returned to a low level. Thus, the comparator 34 generates one pulse signal, which is fed as a step-up signal, i.e., a microinstruction execution completion signal, to the microinstruction program counter 36 as shown in FIG. 2 (f), so that the counter 36 is incremented one count. Accordingly, the next microinstruction is read out in accordance with the content of the program counter 36 and outputted to the input bus 12.

Thereafter, the microinstruction is decoded by the decoder 10 at the rising edge of the succeeding decode timing signal 14. At this time, if the decoder 10 makes the first counter selection signal 14 is inactive, the 1-bit binary counter 8 is put in a reset condition so as to generate an output signal of a low level. On the other hand, the multiplexor 28 operates to select and output the register address signal 20 to the register group 30. Thus, the register group 30 operates to latch the register address signal 20 in response to the rising edge of the register selection timing signal 26, and select one of the registers designated by the latched register address signal 20. Namely, the register group 30 is addressed directly in accordance with the code included in the microinstruction. In this case, on the other hand, the decoder 10 generates the number-of-counter-section signal 22 indicative of "1", so that the program counter 36 is stepped up with selection of only one register.

As seen from the above explanation, during the period from the timing $t_1$ to the timing $t_2$, the registers A and B contained in the register group 30 are selected as follows:
REGISTER A
REGISTER B
REGISTER A
REGISTER B
REGISTER A
REGISTER B The above mentioned embodiment comprises the counter 24 of one bit and the counter 32 of three bits. But, if the counter 24 is of two bit type, four registers A, B, C and D can be selected, and in such a case, if the number-of-counter-selection signal indicating "8" is applied, the registers are selected one by one and eight times in total in a sequence of the registers A, B, C, D, A, B, C and D.

Generally, the counter 24 can have any bit length M (M is positive integer) and the counter 32 can have any bit length N (N is a positive integer not less than M). In addition, the number-of-counter-selection signal 22 can be set at any value in a given microinstruction.

In the above mentioned embodiment, the comparator 34 outputs the step-up signal to the program counter 36. However, since the step-up signal generated by the comparator 34 means the completion of the microinstruction execution, the output of the comparator 34 can be applied to another counter or register, for example, to a stack pointer in the case of interrupt operation.

Further, the counter 32 and the comparator 34 cooperate to detect that a required number of register selections have been completed. Therefore, these elements 32 and 34 can be replaced by a down counter, which is preset to the given number of register selections by the decoder 10 and is counted down at each register selection timing signal, so as to generate a microinstruction execution completion signal when the count of the down counter is brought into "0".

In addition, the register address signal 20 is fed through the multiplexor 28 to the register group 30 so as to determine a firstly selected register. But, the multiplexor 28 can be replaced by a gate circuit, which is controlled by the register address signal 20 so as to allow the output of the counter 24 to pass to the register group 30, so that the output of the counter 24 determines the firstly selected register in the register group 30.

The invention has thus been shown and described with reference to the specific embodiment. However, it should be noted that the invention is in no way limited to the details of the illustrated structure but changes and modifications may be made within the scope of the appended claims.

I claim:

1. A data processing apparatus comprising:
   decoder means receiving a microinstruction to generate at least a first selection signal and a number-of-selection signal;
   first counter means receiving a timing signal and controlled by the first selection signal to generate a first register address signal updated at the timing signal;
   register means including a plurality of registers and receiving the first register address signal to select one of the registers designated by the register address signal;
   second counter means operating to count up in response to the timing signal; and
   means comparing the content of the second counter means with the number-of-selection signal for incrementing a program counter when the content of the second counter means becomes consistent with the number-of-selection signal.

2. An apparatus claimed in claim 1 wherein the decoder means further generate a second register address signal, and further including selection means receiving the first and second register address signals for outputting to the register means one of the first and second register address signals in response to the first selection signal.

3. An apparatus claimed in claim 2 wherein the decoder means further generates a second selection signal to the second counter means, and wherein the second counter means is conditioned for counting in response to the timing signal while the second selection signal is active, and is also reset by the comparator means when the content of the second counter means becomes consistent with the number-of-selection signal.

4. An apparatus claimed in claim 3 wherein the first counter means is a 1-bit binary counter and the second counter means is a 3-bit binary counter.

5. An apparatus claimed in claim 3 wherein the first counter means is a M-bit binary counter (where M is positive integer) and the second counter means is a N-bit binary counter (where N is positive integer not less than M).

6. An apparatus claimed in claim 3 wherein the selection means is a two-input multiplexor.

7. A data processing apparatus comprising:
   a program counter for designating the address of a microinstruction to be read;
   a decoder receiving the microinstruction stored at the address designated by the program counter for generating at least a first selection signal, a second selection signal, a first register address signal and a number-of-counter-selection signal;
   a first counter receiving a first timing signal and controlled by the first selection signal to count the first timing signal when the first selection signal is active so that the first counter generates a second register address signal incremented at each occurrence of the first timing signal;
   a multiplexor receiving the first and second register address signals and controlled by the first selection signal to select and output the second register address when the first selection signal is active;
   a register group including a plurality of registers and responsive to the first timing signal to latch the output of the multiplexor and to select a register designated by the output of the multiplexor;
   a second counter receiving the first timing signal and controlled by the second selection signal to count the first timing signal and controlled by the second selection signal to count the first timing signal when the second selection signal is active; and
   a comparator for comparing the count content of the second counter with the number-of-counter-selection signal and to reset the second counter when the content of the second counter becomes consistent with the number-of-counter-selection signal, with the result that the comparator itself generates one step-up signal to the program counter.

8. An apparatus claimed in claim 7 wherein the first counter means is a 1-bit binary counter and the second counter means is a 3-bit binary counter.

9. An apparatus claimed in claim 7 wherein the first counter means is a M-bit binary counter (where M is positive integer) and the second counter means is a N-bit binary counter (where N is positive integer not less than M).

10. A data processing apparatus comprising decoder means receiving a microinstruction to generate at least a first selection signal and a number-of-selection signal;
    first counter means receiving a timing signal and controlled by the first selection signal to generate a first register address signal updated at the timing signal;
    register means including a plurality of registers and receiving the first register address signal to select one of the registers designated by the register address signal; and
    means coupled to receive the number-of-selection signal and generating a microinstruction execution completion signal when the number of selections of the registers reaches the number indicated by the number-of-selection signal.

11. An apparatus claimed in claim 10 wherein the microinstruction execution completion signal generating means includes second counter means operative to count the timing signal to generate the microinstruction execution completion signal when the number of selections of the registers reaches the number indicated by the number-of-selection signal.

12. An apparatus claimed in claim 11 wherein the second counter means includes a second counter operative to count up in response to the timing signal; and means comparing the content of the second counter with the number-of-selection signal to increment a program counter when the content of the second counter means becomes consistent with the number-of-selection signal.

13. An apparatus claimed in claim 12 wherein the decoder means further generates a second register address signal, and further including selection means receiving the first and second register address signals to output to the register means one of the first and second register address signals in response to the first selection signal.

14. An apparatus claimed in claim 13 wherein the decoder means is operative to further generate a second selection signal to the second counter means, and wherein the second counter means is conditioned for counting in response to the timing signal while the second selection signal is active, and is also reset by the comparator when the content of the second counter means becomes consistent with the number-of selection signal.

* * * * *